(12) United States Patent
Correia Fernandes et al.

(10) Patent No.: US 10,805,473 B2
(45) Date of Patent: Oct. 13, 2020

(54) TRIGGERING A USAGE OF A SERVICE OF A MOBILE PACKET CORE NETWORK

(71) Applicant: VODAFONE GMBH, Duesseldorf (DE)

(72) Inventors: António Carlos Correia Fernandes, Duesseldorf (DE); Walter Bindrim, Haltern am See (DE)

(73) Assignee: VODAFONE GMBH, Duesseldorf (DE)

( * ) Notice: Subject to any disclaimer, the term of this patent is extended or adjusted under 35 U.S.C. 154(b) by 0 days.

(21) Appl. No.: 15/297,770

(22) Filed: Oct. 19, 2016

(65) Prior Publication Data
US 2017/0111792 A1   Apr. 20, 2017

(30) Foreign Application Priority Data
Oct. 19, 2015  (EP) .................................. 15190395

(51) Int. Cl.
*H04L 29/06* (2006.01)
*H04M 15/00* (2006.01)
(Continued)

(52) U.S. Cl.
CPC .......... *H04M 15/47* (2013.01); *H04L 63/029* (2013.01); *H04L 63/0272* (2013.01);
(Continued)

(58) Field of Classification Search
CPC ... H04W 12/06; H04W 76/022; H04W 84/12; H04M 15/47; H04L 63/0272; H04L 63/0823; H04L 63/029
See application file for complete search history.

(56) References Cited

U.S. PATENT DOCUMENTS 8,594,628 B1 * 11/2013 Schroeder ............. H04W 12/06
370/331
9,258,295 B1 * 2/2016 Nedeltchev ......... H04L 63/0823
(Continued)

FOREIGN PATENT DOCUMENTS

EP           2658301 A1 * 10/2013    ............. H04W 12/06
WO      2008/034090        3/2008
(Continued)

*Primary Examiner* — John B King
(74) *Attorney, Agent, or Firm* — Grossman, Tucker, Perreault & Pfleger, PLLC (57) ABSTRACT

A method is provided for using a service of a mobile packet core network in a communication system comprising a mobile device, a node, a mobile packet core network and a wireless radio access network. The mobile device accesses the mobile packet core network via the wireless radio access network. During setup of a connection of the mobile device to the wireless radio access network, the mobile device determines whether the wireless radio access network is trustworthy. If it is not trustworthy, the mobile device establishes a secure tunnel connection to the node of the communication system for triggering usage of the service of communication system by an authentication entity. The secure tunnel connection is established by using a token stored within the mobile device and received by the node. The token comprises at least a certificate for authentication to the authentication entity and is generated using general security mechanisms (e.g., TPM and/or MD5).

19 Claims, 4 Drawing Sheets

(51) Int. Cl.
  *H04W 76/12* (2018.01)
  *H04W 4/24* (2018.01)
  *H04W 12/06* (2009.01)
  *H04W 84/12* (2009.01)

(52) U.S. Cl.
  CPC .......... *H04L 63/0823* (2013.01); *H04W 4/24* (2013.01); *H04W 12/0609* (2019.01); *H04W 76/12* (2018.02); *H04W 84/12* (2013.01)

(56) References Cited

U.S. PATENT DOCUMENTS

| | | | |
|---|---|---|---|
| 9,806,940 B1* | 10/2017 | Nielsen | H04L 41/0803 |
| 2003/0041091 A1* | 2/2003 | Cheline | H04L 29/12066 |
| | | | 709/200 |
| 2005/0282584 A1* | 12/2005 | Faisy | H04W 8/205 |
| | | | 455/558 |
| 2007/0130474 A1 | 6/2007 | Shatford | |
| 2007/0180225 A1* | 8/2007 | Schmidt | H04L 9/321 |
| | | | 713/152 |
| 2008/0003981 A1 | 1/2008 | Sharma et al. | |
| 2008/0198861 A1* | 8/2008 | Makela | H04W 12/06 |
| | | | 370/401 |
| 2009/0100514 A1* | 4/2009 | Jin | H04L 63/0272 |
| | | | 726/15 |
| 2009/0298470 A1* | 12/2009 | Huber | H04L 63/101 |
| | | | 455/411 |
| 2010/0005290 A1* | 1/2010 | Urien | H04L 9/3263 |
| | | | 713/155 |
| 2010/0023755 A1* | 1/2010 | Kotani | G06F 21/33 |
| | | | 713/156 |
| 2012/0233674 A1* | 9/2012 | Gladstone | H04L 9/085 |
| | | | 726/6 |
| 2013/0097674 A1 | 4/2013 | Jindal et al. | |
| 2013/0097710 A1* | 4/2013 | Basavapatna | H04W 4/02 |
| | | | 726/25 |
| 2013/0145452 A1* | 6/2013 | Ollukaren | H04L 63/0272 |
| | | | 726/15 |
| 2013/0212663 A1 | 8/2013 | Edge et al. | |
| 2013/0288644 A1* | 10/2013 | Schroeder | H04W 12/06 |
| | | | 455/411 |
| 2013/0297933 A1* | 11/2013 | Fiducia | H04L 63/0853 |
| | | | 713/156 |
| 2015/0038120 A1* | 2/2015 | Larkin | G06Q 20/3223 |
| | | | 455/411 |
| 2015/0358294 A1* | 12/2015 | Kancharla | G06F 21/335 |
| | | | 713/164 |
| 2016/0143070 A1* | 5/2016 | Liyanage | H04W 76/12 |
| | | | 370/329 |
| 2016/0261596 A1* | 9/2016 | Khello | H04W 12/08 |
| 2016/0330193 A1* | 11/2016 | Singh | H04L 63/0823 |
| 2016/0352918 A1* | 12/2016 | Plestid | H04M 15/60 |
| 2019/0075168 A1* | 3/2019 | Goldfarb | H04L 63/0272 |

FOREIGN PATENT DOCUMENTS

| | | |
|---|---|---|
| WO | 2008/153456 | 12/2008 |
| WO | 2011/137928 | 11/2011 |
| WO | 2012/093396 | 7/2012 |
| WO | WO-2013169161 A1 * 11/2013 | ............ H04W 76/10 |
| WO | 2015/131949 | 9/2015 |

* cited by examiner

TRIGGERING A USAGE OF A SERVICE OF A MOBILE PACKET CORE NETWORK

CROSS REFERENCE TO RELATED APPLICATION

This application claims priority to European Patent Application No. 15 190 395.2 filed on Oct. 19, 2015, the disclosure of which is incorporated by reference herein in its entirety.

FILED OF THE INVENTION

The present invention relates to a method for using a service of a mobile packet core network in a communication system comprising a mobile device, a node, a mobile packet core network and a wireless radio access network, whereby the mobile device accesses the mobile packet core network via the wireless radio access network, whereby the mobile device during a setup of a connection of the mobile device to the wireless radio access network determines whether the wireless radio access network is a trustworthy wireless radio access network and at least if the wireless radio access network is not trustworthy establishes a secure tunnel connection to a node of the communication system for triggering a usage of a service of the mobile packet core network by an authentication entity of the mobile packet core network.

The present invention further relates to a node of a communication system comprising a mobile device, a mobile packet core network and a wireless radio access network to which the mobile device can establish a secure tunnel connection.

Another object of the invention is a provisioning system of a communication system comprising a mobile device, a mobile packet core network and a wireless radio access network.

Furthermore, the invention relates to a system for using a service of a mobile core packet network in a communication system comprising a node of the communication system, a provisioning system of the communication system and a mobile device of the communication system.

BACKGROUND

The prior art proposes methods to provide the possibility to use mobile data over a wireless radio access network, for example a Wi-Fi technology, as an additional radio access network. A disadvantage by using mobile data, in particular services of the mobile packet core network is that it is not ensured that the mobile device requesting the access to the service of the mobile packet core network is authorized. Therefore, a need for a solution allowing a secure access to core services of the mobile packet core network and also a secure access to the internet is given.

Known from the prior art for the aforementioned case are authentication methods, such as EAP-SIM/AKA, WPA2 and so called IPsec tunnels for Wi-Fi access to a mobile packet core network, which is also referred to as MNO (MNO: Mobile Operator Network). In these approaches, the identification of the user of the mobile device may be considered, for instance by using the MSISDN (MSISDN: Mobile Subscriber Integrated Services Digital Network) and/or the IMSI (IMSI: International Mobile Subscriber Identity) representing identification, the overall security remains flawed. A drawback of the EAP-SIM/AKA authentication known from the 3GPP standard is that an access to information stored on a SIM (SIM: Subscriber Identity Module) or USIM (USIM: Universal SIM) is required so that for instance the MSISDN and/or IMSI can be used for the authentication. Therefore, devices, which are not equipped with a SIM or USIM cannot get access to services of the mobile packet core network even though the device may be capable of getting access, for instance by using a wireless radio access network to connect to the mobile packet core network. Furthermore, especially an application on a device cannot get access to the information stored on the SIM respectively USIM, for instance, the SIM credentials, even if the device is equipped with a SIM or USIM, when the device is not ePDG (ePDG: evolved Packet Data Gateway) compliant.

The prior art document WO2015/131949 A1 proposes a method for the solution of some of the aforementioned drawbacks by using credentials stored within a mobile device as credentials towards an entity of the mobile packet core network to authorize the user of the mobile device. The credentials are created during an initial setup. Devices, which are not equipped with a SIM or an USIM should get a so called virtual MSISDN and/or virtual SIM, which is generated during the initial setup by the mobile network and stored within a database of the mobile packet core network, whereby the database stores the relationship between the credentials stored within the mobile device and a MSISDN respectively virtual MSISDN and/or IMSI respectively virtual IMSI. For using a service of a mobile packet core network the mobile device transmits the certificate to an entity of the mobile packet core network, which triggers the database to get the linked MSISDN respectively virtual MSISDN and/or IMSI respectively virtual IMSI, which are used to establish a connection between the mobile device and the mobile packet core network. A first drawback of the proposed solution is that the credentials can be copied to other devices so that these devices can get access to the mobile packet core network as well. This is susceptible for fraud by unauthorized users. Furthermore, each time an access is requested from the mobile device to the mobile packet core network, the entity of the mobile packet core network has to trigger the database for receiving the linked MSISDN respectively virtual MSISDN and/or IMSI respectively virtual IMSI to establish a secure connection. The data traffic of such a solution is quite high so that there are significant operational costs. Furthermore, these known solutions require a modification of several standard nodes and require that each device requesting access to the mobile packet core network has to get a dedicated certificate, which creates further costs.

Regarding the aforementioned prior art it is the technical object of the invention to provide a solution, which reduces the operational costs of operating for triggering a usage of a service of a mobile packet core network by a mobile device and which enhances the security of using a service of a mobile packet core network when accessing the mobile packet core network via a not trustworthy wireless radio access network from the mobile device.

SUMMARY

As a technical solution the invention proposes a method for using a service of a mobile packet core network in a communication system comprising a mobile device, a node, a mobile packet core network and a wireless radio access network, whereby the mobile device accesses the mobile packet core network via the wireless radio access network, whereby the mobile device during a setup of a connection of the mobile device to the wireless radio access network determines whether the wireless radio access network is a trustworthy wireless radio access network and at least if the wireless radio access network is not trustworthy establishes a secure tunnel connection to a node of the communication system for triggering a usage of a service of the mobile packet core network by an authentication entity of the mobile packet core network, which is characterized in that the secure tunnel connection is established by using a token respectively key stored within the mobile device and received from the mobile device by the node, whereby the token respectively key comprises at least a certificate for authentication to the authentication entity, a MSISDN respectively a virtual MSISDN (vMSISDN) and/or an IMSI respectively a virtual IMSI (vIMSI) allocated to the user of the mobile device and whereby the token respectively key is generated by the node using general security mechanisms, in particular TPM (TPM: Trusted Platform Module) and/or MD5 (MD5: Message-Digest Algorithm 5).

In the sense of the invention a token respectively key is a kind of information that comprises essential information for executing the invention in particular information for using a service of the mobile packet core network. The term token and the term key mark exactly the same and for reasons of simplicity the term token is used in the following.

The communication system according to the invention comprises a mobile device, a node, a mobile packet core network and a wireless radio access network.

The mobile device can be a mobile phone, smart phone, tablet or any other mobile communication device capable of connecting to a wireless radio access network. In the following, the mobile device may be referred to as user equipment (UE). In particular the mobile device can be capable of supporting a classic mobile radio access technology, for example Wi-Fi, and/or capable of connecting to the mobile packet core network via radio access networks which are different from the wireless radio access networks, which are for instance GRAN, GERAN, UTRAN or E-UTRAN. Thus, the present invention supports mobile devices a SIM or an USIM and also mobile devices without a SIM or an USIM, for example a device with Wi-Fi only capabilities.

The mobile packet core network is a packet switched domain network. The mobile packet core network can in particular be a network according to 2G-, 3G, and or LTE (3GPP)-standards. The mobile packet core network comprises entities such as data bases, for instance HLR (HLR: Home Location Register), HSS (HSS: Home Subscriber Server), VLR (VLR: Visitor Location Register), EIR (EIR: Equipment Identity Register) as well as service entities such as MSC (MSC: Mobile Switching Centre), SMSC (SMSC: Short Message Service Centre) and an AAA server (AAA: Authentication, Authorization and Accounting server). The AAA server will hereinafter be referred to as AAA.

The wireless radio access network is a radio access network for access to the mobile packet core network. It should be noted that this radio access network hereinafter will be referred to as wireless radio access network in order to distinguish it from other radio access networks which may be used by the mobile device to access the mobile packet core network directly. The wireless radio access network can in particular be a wireless local area network (WLAN) and most preferably a Wi-Fi (Wireless Fidelity) network. The Wi-Fi network is in particular a network governed by protocol IEEE 802.11 which defines the communication in this network.

In the communication system according to the invention, wireless radio access technology is thus combined with the communication via mobile packet core network for accessing the core network, for example for retrieving content from the internet.

The node of the communication system is an entity of the communication system, preferably a VPN (Virtual Private Network) concentrator node or an ePDG (ePDG: evolved Packed Data Gateway), or in the alternative a TTG (TTG: Tunnel Termination Gateway), which receives an authorization request of a mobile device, in particular by an enhanced ANDSF application (ANDSF: Access Network Discovery and Selection Function) for authorization of a user for the usage of a service of the mobile packet core network. In a preferred embodiment the node is part of the mobile packet core network.

A VPN concentrator is a type of aforementioned node that provides a secure creation of VPN connections and delivery of messages and/or services between VPN nodes. The VPN concentrator node is able to terminate a secure tunnel connection, for instance an IPSec tunnel and forward the traffic to a TWAN (TWAN: Trusted Wireless Access Network). This forwarding of traffic is used, when no ePDG node is available in the mobile packet core to get access to it. The TWAN can be part of the mobile packet core network, or could be part of the communication system with access to the mobile packet core network. An ePDG provides security mechanisms such as IPsec tunneling of connections with a mobile device over an untrusted non-3GPP access, such as an untrusted Wi-Fi network. A TTG terminates IPsec tunnels and maps the IPSec tunnels into GTP tunnels terminated in the GGSN (GGSN: Gateway GPRS Support Node), whereby the GGSN is typically not able to terminate IPSec tunnels. In one embodiment the aforementioned node of the communication system is only part of the communication system, and not a part of the mobile packet core network. Said node outside of the mobile packet core network has or is able to get access to the mobile packet core network. This can be realized in a preferred embodiment by a VPN concentrator node—inside or outside of the mobile packet core network—and a TWAN outside of the mobile packet core network, but with access to the mobile packet core network. Incoming traffic is terminated by the VPN concentrator node and forwarded to the TWAN so that a secure tunnel connection is established between the mobile device and the mobile packet core network.

The service of the mobile packet core network is provided by establishing a secure tunnel connection between the mobile device and the mobile packet core network. The secure tunnel connection is preferably a connection according to the GTPv2 (GTP: GPRS Tunneling Protocol; v2: for LTE-networks), so that a provisioning of services of the mobile packet core network is possible even when the mobile device requesting the service is accessing via an untrustworthy network. The services of the mobile packet core network can be divided into two parts: the first part comprises services of the trusted function of the mobile packet core network and the second part comprises services of the untrusted function of the mobile packet core network.

According to the present invention the determination of the trustworthiness of a wireless radio access network on side on the mobile device is determined by an application, preferably by the aforementioned enhanced ANDSF application, executed on the mobile device. The application determining the trustworthiness of a wireless radio access network is preferably previously downloaded to and installed on the mobile device. In a preferred embodiment, the application determining the trustworthiness of a wireless radio access network is downloaded and installed onto the mobile device via an ACS (ACS: Auto Configuration Server) of the mobile packet core network provided by the Mobile Network Operator.

In a further embodiment of the present invention the secure tunnel connection to a node of the mobile packet core network is established by an application executed by the mobile device, preferably a VPN application on part of the mobile device. According to a further embodiment of the present invention the application establishing the secure tunnel connection to a node of the mobile packet core network is started by the application determining the trustworthiness of the wireless radio access network, if the wireless radio access network is not trustworthy.

In a preferred embodiment of the invention the application (enhanced ANDSF application) is an ANDSF client, which is able to retrieve a token from an entity of the mobile packet core network, preferably a node of the mobile packet core network during an initial setup. Furthermore, the ANDSF client is able to manage the token and/or capable of starting the application establishing the secure tunnel connection on the mobile device, when the wireless radio access network is not trustworthy. The enhanced ANDSF application is for managing. VPN functions are used to terminate. The application establishing the secure tunnel connection is preferably previously downloaded to and installed on the mobile device. In a preferred embodiment, the application establishing the secure tunnel connection is downloaded and installed onto the mobile device via an ACS (ACS: Auto Configuration Server) of the mobile packet core network provided by the Mobile Network Operator.

In a further embodiment the application determining the trustworthiness of the wireless radio access network and the application establishing the secure tunnel connection to a node of the communication system are combined into a single application executed and running on the mobile device. The combination of both aforementioned applications into a single application is not necessary for the present invention, but a possible embodiment.

During a usage for the first time by requesting access to the mobile packet core network, also referred to as initial setup, preferably requested via the enhanced ANDSF application, the node of the communication system generates a token, which is used by the mobile device to establish a secure tunnel connection between the mobile device and the mobile packet core network. The token comprises at least a certificate for authentication to the authentication entity, preferably the AAA, a MSISDN respectively virtual MSISDN and an IMSI respectively virtual IMSI allocated to the user of the mobile device. The aforementioned information is needed to get access to the mobile packet core network of the mobile device via an untrusted network. The certificate can be created individually a provisioning system, for instance based on a MSISDN respectively virtual MSISDN and/or an IMSI respectively virtual IMSI. The certificate is created by a PM (PKI: Preshared key infrastructure) or a CA (CA: Certificate Authority) of the provisioning system. The relationship between a MSISDN respectively virtual MSISDN and/or an IMSI respectively virtual IMSI can be located in a database of the communication system, in particular a database of the node. The node triggers for instance a provisioning system, which retrieves the MSISDN and/or IMSI during the initial setup out of a data base of the mobile packet core network, or, when the device requesting the initial setup not equipped with a SIM or USIM, generated a virtual MSISDN and/or virtual IMSI.

According to the invention the token is generated by the node using general security mechanisms, in particular TPM or MD5. As a result, the token is encrypted so that when the token is transmitted to the mobile device after completion of the initial setup, the token is stored within the mobile device in an encrypted manner Therefore, it cannot be seen from the outside what is within the token, which enhances the security of the invention so that it is very hard for unauthorized users to get their hands on the token, because they do not know that behind the encrypted data a token is represented, which comprises a certificate, a MSISDN respectively a virtual MSISDN and an IMSI respectively virtual IMSI and which are required to get access to a mobile packet core network via a secure tunnel connection from the mobile device to the mobile packet core network. As a result, only the node, which generated the token knows the used certificate, MSISDN respectively virtual MSISDN and IMSI respectively virtual IMSI. Furthermore, only the node that generated the token knows the exact key of the used general security mechanism, which was used for the generation of token and which can be used for decrypting the data of the token.

In a further embodiment the node transmits the generated token to a provisioning system, in particular of the mobile packet core network for verifying the generated token at the first time a usage of a service of the mobile packet core network is requested by the mobile device. Advantageously, after the generation of the token during the initial setup, the token is transmitted to the provisioning system. The provisioning system is able to verify the token, for instance by checking the check sum of the used general security mechanism. In an embodiment, the provisioning system transmits the token to the mobile device or the token can be directly transmitted to the mobile device without transmitting the token beforehand to the provisioning system. But the provisioning system is required in a preferred embodiment of the invention, which enhances the security of the proposed solution even more by adding a second security instance to the proposed method.

In a preferred embodiment the token further comprises a timer and/or counter value for preventing fraud of the token by decrementing the timer and/or counter value by 1 by the provisioning system during the first time a usage of a service of the mobile packet core network is requested by the mobile device, whereby the token is transmitted from the provisioning system to the mobile device after the decrement. This is done preferably during the initial setup, for instance on request of the enhanced ANDSF application, and is done in particular automatic after the generation of the token by the node. For example the token is generated by the node and comprises a timer and/or counter, which is set to the enhanced value of 1. After the generation of the token, the token is transmitted to the provisioning system, which verifies the received token and reduces the timer and/or counter value by 1 to the value of 0. The value is always decremented by 1, if the token is received by the provisioning system during the first time a usage of a service of the mobile packet core network is requested by a mobile device, preferably by the enhanced ANDSF application of the mobile device. After the decrement, the token is transmitted to the mobile device and is stored within the mobile device and has got at that time the timer and/or counter value of 0.

If the token is copied unauthorized to another device, and the unauthorized device requests access, e. g. an authentication request, to the mobile packet core network, the token is—as described above—transmitted to the provisioning system since it is the first time this devices requests access to the mobile packet core network. The provisioning system decrements the timer and/or counter value by 1, so that the timer and/or counter value equals now −1 and is sent back to the mobile device. When the mobile device tries to establish a secure tunnel connection to the mobile packet core network, the timer and/or counter value can be checked and when it does not equal the value of 0, the used token is rejected since fraud is very likely. Of course, other implementations, which realize the same effect are possible.

Another embodiment is characterized in that the node rejects the received token if the timer and/or counter value is decremented by more than 1 to prevent fraud of the token.

In an embodiment of the invention the node verifies the received token by using general security mechanisms used to generate the token when an authentication request of the mobile device is received. It can be checked, if the token was changed in some manner which can be an indicator for fraud. If a change of the token is determined, the token is rejected so that the access of the mobile device to the mobile packet core network requesting the authorization is denied.

In another embodiment, the node extracts the certificate, the MSISDN respectively the virtual MSISDN and the IMSI respectively virtual IMSI out of the received token. Advantageously, this is done after the successful verification of the received token during an authorization request received by the node from the mobile device. The extracted information is used for establishing a secure tunnel connection between the mobile device and the mobile packet core network for using a service of the mobile packet core network.

An embodiment of the invention is characterized in that the node passes the extracted certificate to the authentication entity, in particular to an authentication entity of the mobile packet core network, which uses the certificate for triggering usage of a service of the mobile packet core network. For instance, the node does an EAP-TLS authentication via the authentication entity with the extracted certificate for authentication of the user towards the authentication entity. If the authentication is successful, the authentication entity sends an acknowledgement or suchlike back to the node so that the node knows that the user requesting to get access to a service of the mobile packet core network is authorized.

In preferred embodiment of the invention the node uses the extracted MSISDN respectively virtual MSISDN and IMSI respectively virtual IMSI to establish the secure tunnel connection to the mobile packet core network for triggering usage of a service of the mobile packet core network. The secure tunnel connection is preferably using a GTPv2 (GTP: GPRS Tunneling Protocol) for establishing the connection.

In another embodiment of the invention, the node retrieves a MSISDN respectively virtual MSISDN and/or IMSI respectively virtual IMSI allocated to the user of the mobile device out of a database of the communication system, in particular triggered by the provisioning system.

An embodiment of the invention is characterized in that the provisioning system generates a virtual MSISDN and a virtual IMSI if the mobile device does not have a SIM respectively an USIM (also called SIM-less or USIM-less device), and reports the generated virtual MSISDN and virtual IMSI to the node of the communication system. The generated virtual MSISDN and virtual IMSI are reported to the node, so that the token can be generated accordingly. The usage of a virtual MSISDN and/or virtual IMSI advantageously allows the usage of the proposed solution even if the mobile device can access the communication system only via a wireless radio access network, preferably the mobile device is a wireless-radio-access-network-only (Wi-Fi-only) device. Advantageously, there is no limitation for e. g. Gi-LAN services using the virtual MSISDN and/or the virtual IMSI in comparison to MSISDN and/or IMSI. Thus it is possible to use the virtual MSISDN and/or the virtual IMSI in case of untrusted networks. For this a client on the mobile device might need to be modified.

A virtual MSISDN and/or a virtual IMSI according to the invention is a piece of information or an identifier with a data format or structure similar to a MSISDN for a virtual MSISDN or an IMSI for a virtual IMSI. The virtual MSISDN and/or the virtual IMSI provided are designed to use services of the mobile packet core network without having to use a SIM or USIM with a mobile device. Advantageously, the virtual MSISDN and/or the virtual IMSI works inside the mobile network environment or if the mobile device is changed to support this. For this the virtual MSISDN and/or the virtual IMSI is advantageously stored and provided within the mobile packet core network and/or the mobile device. With this a virtual MSISDN and/or a virtual IMSI according to the present invention advantageously services could be offered as with a standard MSISDN and/or IMSI. The services offered are preferably based on a profile stored in the mobile packet core network, for example in the HLR or the HSS. The services advantageously comprise charging services and/or authentication services of the mobile packet core network. Using a virtual MSISDN and/or virtual IMSI allows the usage of other wireless or wired technologies, for example Bluetooth or Ethernet, for accessing the mobile packet core network with a mobile device. A further preferred embodiment of the invention suggests the usage of a Wi-Fi- or IP-webcam as a mobile device without a SIM/USIM. The Wi-Fi- or IP-webcam gets a virtual MSISDN and/or a virtual IMSI so that an access with these devices to the mobile packet core network is possible. For instance in case of a movement in the monitored area of the Wi-Fi- or IP-webcam signaling of the movement is possible.

A preferred embodiment is characterized in that the provisioning system is part of the node and/or the node is part of the mobile packet core network. Therefore, the provisioning system and the node are combined and form an entity, which can be a node, in particular a VPN concentrator node or an ePDG respectively TTG, or included into a node, in particular into a VPN concentrator node or an ePDG respectively TTG, in particular of the mobile packet core network.

In a further embodiment the token is stored securely within the mobile device. Advantageously, there is no possibility for a user or any kind of application other than the enhanced ANDSF application and/or VPN client application to access the stored token without being approved by the mobile network operator. This feature enhances the security of the invention even more.

As a technical solution to the aforementioned problem the invention furthermore proposes a node of a communication system comprising a mobile device, a mobile packet core network to which the mobile device can establish a secure tunnel connection and a wireless radio access network, which is characterized in that the node comprises means for generating a token using general security mechanisms, in particular TPM (TPM: Trusted Platform Module) and/or MD5 (MD5: Message-Digest Algorithm 5), whereby the token comprises at least a certificate for authentication to the authentication entity, a MSISDN respectively a virtual MSISDN and/or an IMSI respectively a virtual IMSI allocated to a user of the mobile device, and means for establishing a secure tunnel connection to the mobile packet core network by using a token received by the mobile device.

Advantageously, the node furthermore comprises means for transmitting the generated token to a provisioning system, in particular of the mobile packet core network for verifying the generated token at the first time a usage of a service of the mobile packet core network is requested by the mobile device.

In a preferred embodiment, the node is characterized by means for rejecting a received token, if the timer and/or counter value of the token is decremented by more than 1 to prevent fraud of the token.

Another embodiment of the node furthermore comprises means for verifying a token received by the mobile device by using general security mechanisms used to generate the token when an authentication request of the mobile device is received.

An embodiment of the invention is characterized by means for extracting the certificate, the MSISDN respectively the virtual MSISDN and the IMSI respectively the virtual IMSI out of the received token.

In another embodiment of the invention the node is characterized by means for passing the extracted certificate to an authentication entity (AAA), in particular an authentication entity (AAA) of the mobile packet core network for triggering a usage of a service of the mobile packet core network.

In a preferred embodiment of the invention the node further comprises means for establishing a secure tunnel connection to the mobile packet core network for triggering a usage of a service of the mobile device by using the extracted MSISDN respectively virtual MSISDN and IMSI respectively virtual IMSI.

Another embodiment of the invention is characterized by means for retrieving the MSISDN respectively the virtual MSISDN and/or the IMSI respectively the virtual IMSI allocated to the user of the mobile device out of a database of the communication system, in particular triggered by a provisioning system, in particular of the mobile packet core network.

In another preferred embodiment the node is designed and/or adapted to be employed in a method according to the invention.

As a technical solution to the aforementioned problem the invention proposes a provisioning system respectively provisioning tool of the communication system, in particular of a mobile packet core network of a communication system comprising a mobile device, a mobile packet core network and a wireless radio access network, characterized in that the provisioning system comprises means for decrementing a timer and/or counter value by 1 for preventing fraud of a token during the first time a usage of a service of the mobile packet core network is requested by the mobile device, and means for transmitting a token to the mobile device after the decrement of the timer and/or counter of the token.

Advantageously, the provisioning system respectively provisioning tool comprises furthermore means for generating a virtual MSISDN and/or a virtual IMSI if the mobile device does not have a SIM.

In a preferred embodiment the provisioning system respectively provisioning tool is characterized by means for reporting the generated virtual MSISDN and/or virtual IMSI to a node of the communication system and/or means for verifying the generated token at the first time a usage of a service of the mobile packet core network is requested by the mobile device.

In another preferred embodiment the provisioning system respectively provisioning tool is part of a node, in particular a node of the mobile packet core network, preferably a node according to the present invention.

The provisioning system respectively provisioning tool is advantageously designed and/or adapted to be employed in a method according to the present invention.

As a further technical solution to the aforementioned problem the invention proposes a system for using a service of a mobile packet core network in a communication system comprising a node of the communication system, a provisioning system of the communication system, and a mobile device of the communication system, whereby the node, the provisioning system, and the mobile device are designed and/or adapted to be employed.

BRIEF DESCRIPTION OF THE DRAWINGS

Other details, characteristics and advantages of the invention will be explained in detail in the following by means of the exemplary embodiments represented in the figures.

DETAILED DESCRIPTION

In FIG. 1 to FIG. 4 only those entities of the communication system which are being used for the method according to the present invention and which play a major role in carrying out the method according to the present invention are depicted. Further entities will be present on part of the mobile network and may be used. As the communication in such a communication system is known, these additional entities are not specifically shown or mentioned in the following. In addition, for the sake of clarity, only one mobile device (UE) is shown in FIG. 1 to FIG. 4. It is, however, obvious that several mobile devices (UE) may be part of the communication network.

A Secure ID is a token in the sense of the invention, whereby the Secure ID comprises at least a certificate for authentication to the AAA, a MSISDN and an IMSI, or in the case the mobile device does not have a SIM respectively USIM, a virtual MSISDN and a virtual IMSI. The Secure ID is generated on part of a node of the mobile packet core network, at hand in FIG. 1 the VPN concentrator node, which is in FIG. 1 named VPN for reasons of simplicity.

Figure 1:
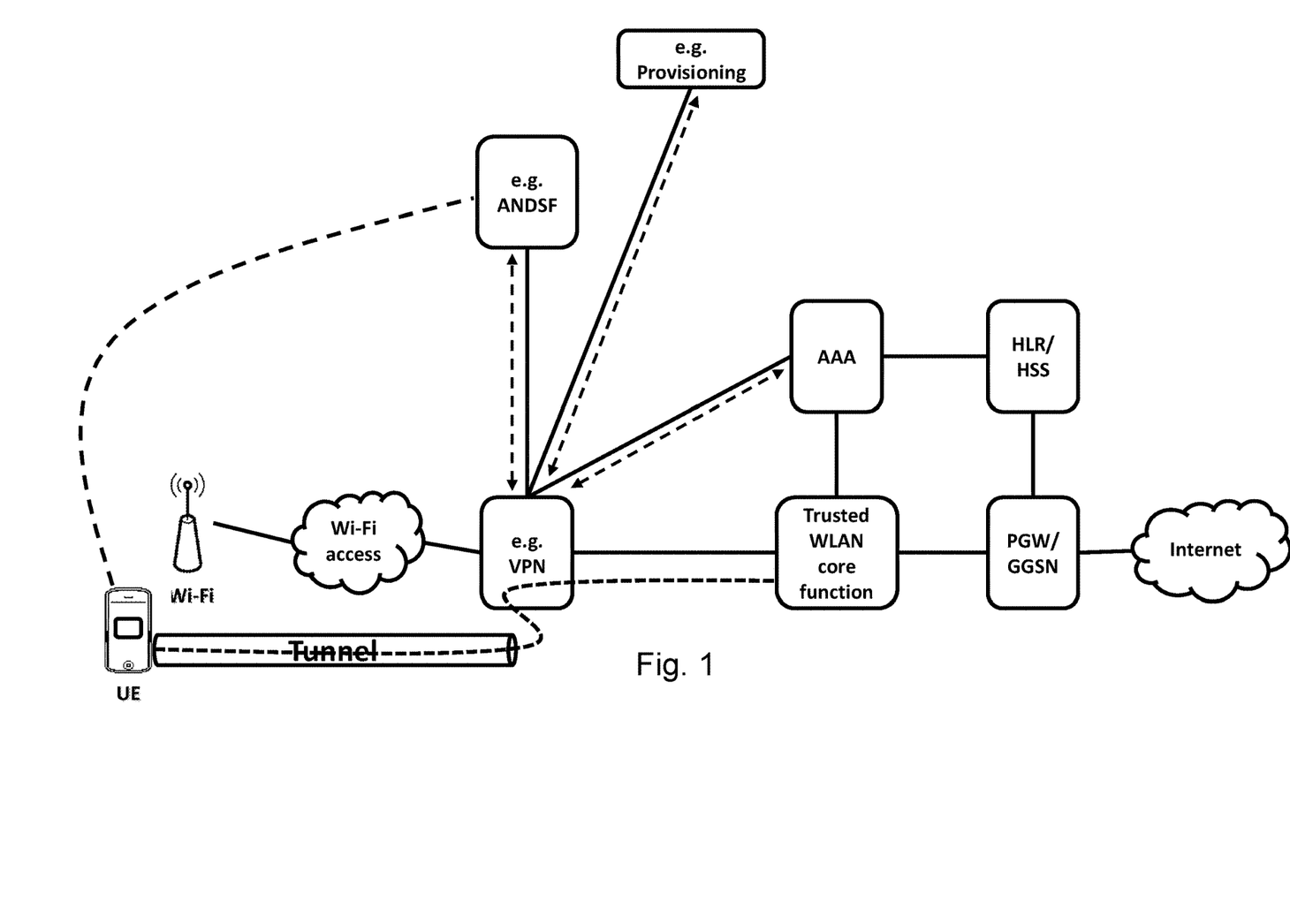
FIG. 1 is a schematic diagram of entities of a communication system used in a first embodiment according to the invention for using an untrusted wireless radio access network, especially Wi-Fi, as access to the trusted function of the mobile packet core network for using services of the mobile packet core network.

A user of a mobile device (UE) is a customer respectively subscriber of services, especially core services offered by a MNO of a mobile packet core network, in particular a 2G, 3G and/or LTE network. The mobile device (UE) can access a wireless radio access network, in particular a Wi-Fi network via its Wi-Fi access points. The mobile device in the present embodiment does not offer the possibility to use, download and/or install a TTG or ePDG client.

The user has to subscribe for using such services to the MNO in advance of the method of the present invention. The subscription is done e.g. via a provisioning system or provisioning tool provided by the mobile packet core network of the MNO. The provisioning system or provisioning tool gathers the MSISDN and/or IMSI of the customer respectively of the mobile device (UE) of the customer and stores the linked information in a database of the mobile packet core network. If the customer respectively subscriber does not have or use a SIM or a USIM, the provisioning system respectively provisioning tool will generate a virtual MSISDN and/or a virtual IMSI, especially, when the customer respectively subscriber uses a Wi-Fi only device or a SIM-less respectively USIM-less device. The MSISDN respectively virtual MSISDN and/or the IMSI respectively IMSI are passed from the provisioning system respectively provisioning tool to a node of the mobile packet core network, at hand the VPN concentrator node of the mobile packet core network.

A VPN concentrator is a type of entity of the mobile packet core network that provides a secure creation of VPN connections and delivery of messages between VPN nodes. At hand, it is used for creating a token, also referred to as Secure ID, which is used for establishing a secure tunnel connection from the mobile device (UE), at hand from an enhanced ANDSF client or directly from a VPN application of the mobile device (UE) to the VPN concentrator node of the mobile packet core network.

The Secure ID as a token is generated by the VPN concentrator node of the mobile packet core network by using general security mechanisms, at hand by using TPM.

At the mobile device (UE), a VPN client respectively application and optional an enhanced ANDSF application is downloaded via ACS (ACS: Auto Configuration Server). The ACS provides the used application in the present invention to the mobile device (UE). The generated Secure ID is transferred from the VPN concentrator node of the mobile packet core network to the enhanced ANDSF application of the mobile device (UE). In the alternative, the generated Secure ID is transmitted directly to the VPN client of the mobile device, since the enhanced ANDSF application is optional. The transmission of the generated Secure ID to the mobile device (UE) is done in a secure manner, at hand by using a so called macro network. In a preferred embodiment the Secure ID is stored in a secure area of the mobile device (UE), e.g. in an encrypted area with limited access to it.

The generated Secure ID comprises furthermore a timer and/or counter in the following also referred to as counter, which will be decreased by the value of 1, when it is transmitted to the mobile device (UE). The security of the method according to the present invention is enhanced according to the aforementioned feature by the fact that if the counter has been reduced by more than the value of 1 beforehand, the Secure ID is not valid anymore and the VPN application on part of the mobile device will not work. The Secure ID is used for establishing a secure tunnel connection, at hand a secure VPN connection from an untrusted Wi-Fi network, in which the mobile device (UE) is logged on.

In a preferred embodiment, the counter value of the Secure ID is checked, when the Secure ID is transmitted from the enhanced ANDSF application or directly from the VPN application of the mobile device (UE) to the VPN concentrator node of the mobile packet core network. The VPN concentrator node of the mobile packet core network rejects the Secure ID, which the customer wants to use to establish a secure tunnel connection to the mobile packet core network of the MNO, if the counter value has been decreased by more than 1. If the received Secure ID is valid, whereby the timer of the Secure ID has a value, which was only decreased by 1 the VPN concentrator node extracts the certificate, the MSISDN respectively virtual MSISDN and the IMSI respectively virtual IMSI out of the Secure ID by using the security mechanism, which was used to generate the Secure ID and which is known by the VPN concentrator node.

The certificate is passed from the VPN concentrator node to the AAA of the mobile packet core network, or in the alternative to an equivalent PM (PKI: Pre-Shared Key Infrastructure) or CA (CA: Certificate Authority) to get secure access to the VPN concentrator node of the mobile packet core network, if the certificate approves to be valid when checked by the AAA or equivalent PKI or CA.

After the authentication of the certificate by the AAA, an acknowledgement or the like is passed back to the VPN concentrator node of the mobile packet core network, so that the MSISDN respectively virtual MSISDN and IMSI respectively virtual IMSI are used to establish a secure tunnel connection to the trusted WLAN core function of the mobile packet core network, at hand the secure tunnel connection is established to the TWAN or PGW of the mobile packet core network. As a secure tunnel connection, at hand a GTPv2 connection is used.

The secure tunnel connection is schematically drawn in FIG. 1 by using a dashed line from the mobile device to the trusted WLAN core function of the of the mobile packet core network.

Figure 2:
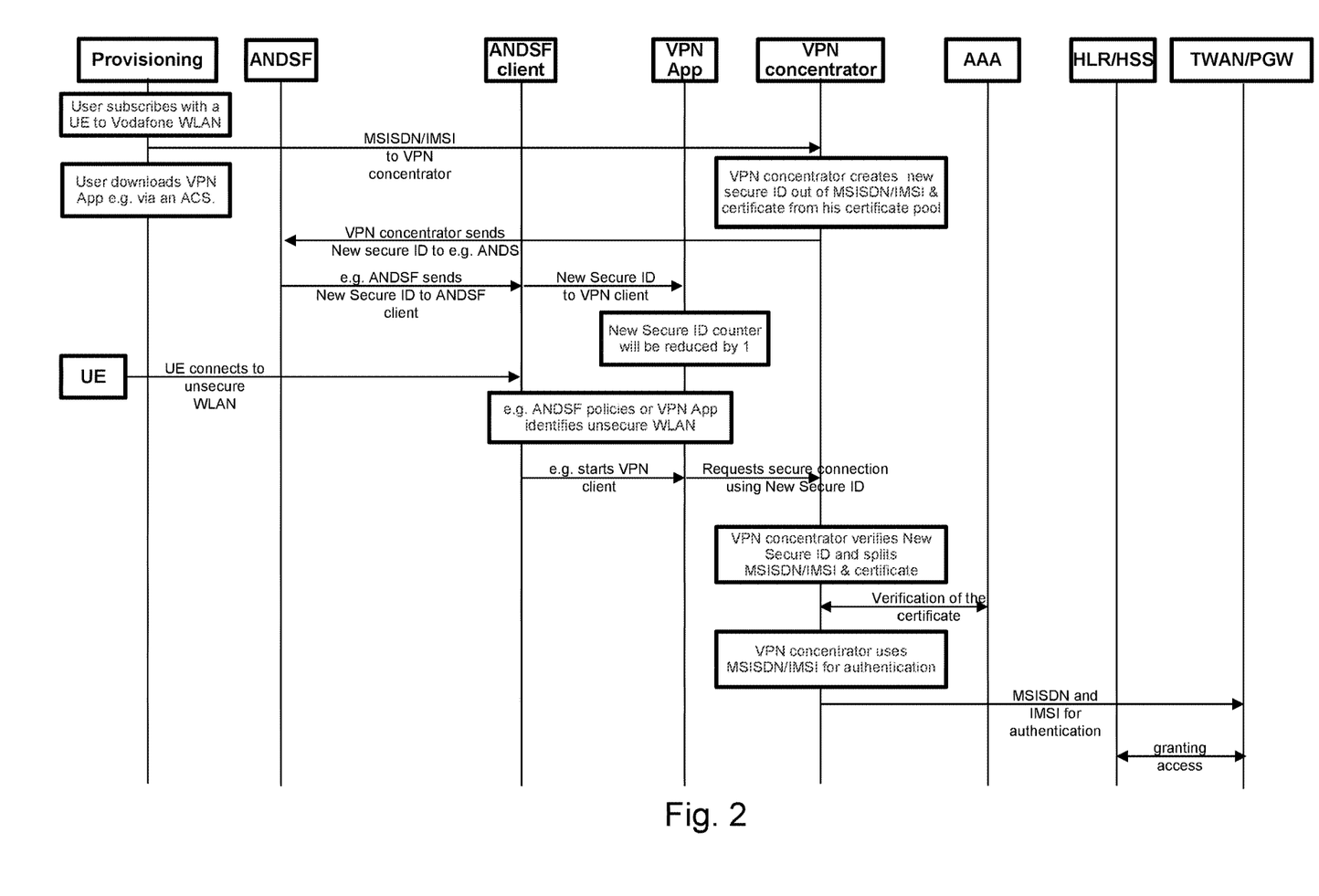
FIG. 2 is an information flow of the embodiment according to FIG. 1 of the invention for using wireless radio access network as access to the mobile packet core network.

The information flow of the method according to the present invention according to FIG. 2 of the embodiment according to FIG. 1 (access to trusted function of mobile packet core network) comprises the following steps:

a) User subscribe to service via provisioning system;
b) Provisioning system will pass MSISDN and/or IMSI information to VPN concentrator. If subscriber does not have a SIM/USIM card, provisioning system will generate a virtual MSISDN and/or virtual IMSI;
c) VPN concentrator generates a new Secure ID out of a certificate (VPN has a limited amount of certificates it could use) and the MSISDN respectively virtual MSISDN and/or IMSI respectively virtual IMSI. VPN is using tools like e.g. TPM to create the new Secure ID;
d) User downloads the VPN client via e.g. ACS (ACS: Auto configuration server);
e) VPN concentrator sends the created new Secure ID to the ANDSF or directly to the VPN client in a secure way (preferable via macro network). new Secure ID will be stored in a secure area of the device;
f) Secure ID counter will be reduced by one when transmitted to VPN client. If the counter already has been reduced the new Secure ID is not valid anymore and the VPN application will not work;
g) When user connects to untrusted Wi-Fi network the UE (e.g. using an enhanced ANDSF) will establish a secure VPN connection to the VPN concentrator using the new Secure ID;
h) VPN concentrator verifies if this a valid new Secure ID including the verification of the new Secure ID counter. If yes the VPN concentrator extracts the new Secure ID to get the Certificate out of the pool it has and the MSISDN respectively virtual MSISDN and/or IMSI respectively virtual IMSI;

i) VPN concentrator passes the certificate e.g. to AAA or an equivalent PM system to get secure accesses to the VPN concentrator;

j) VPN concentrator will use MSISDN respectively virtual MSISDN and/or IMSI respectively virtual IMSI to establish a connection to TWAN and PGW; and k) Remain of the flow is standard.

Figure 3:
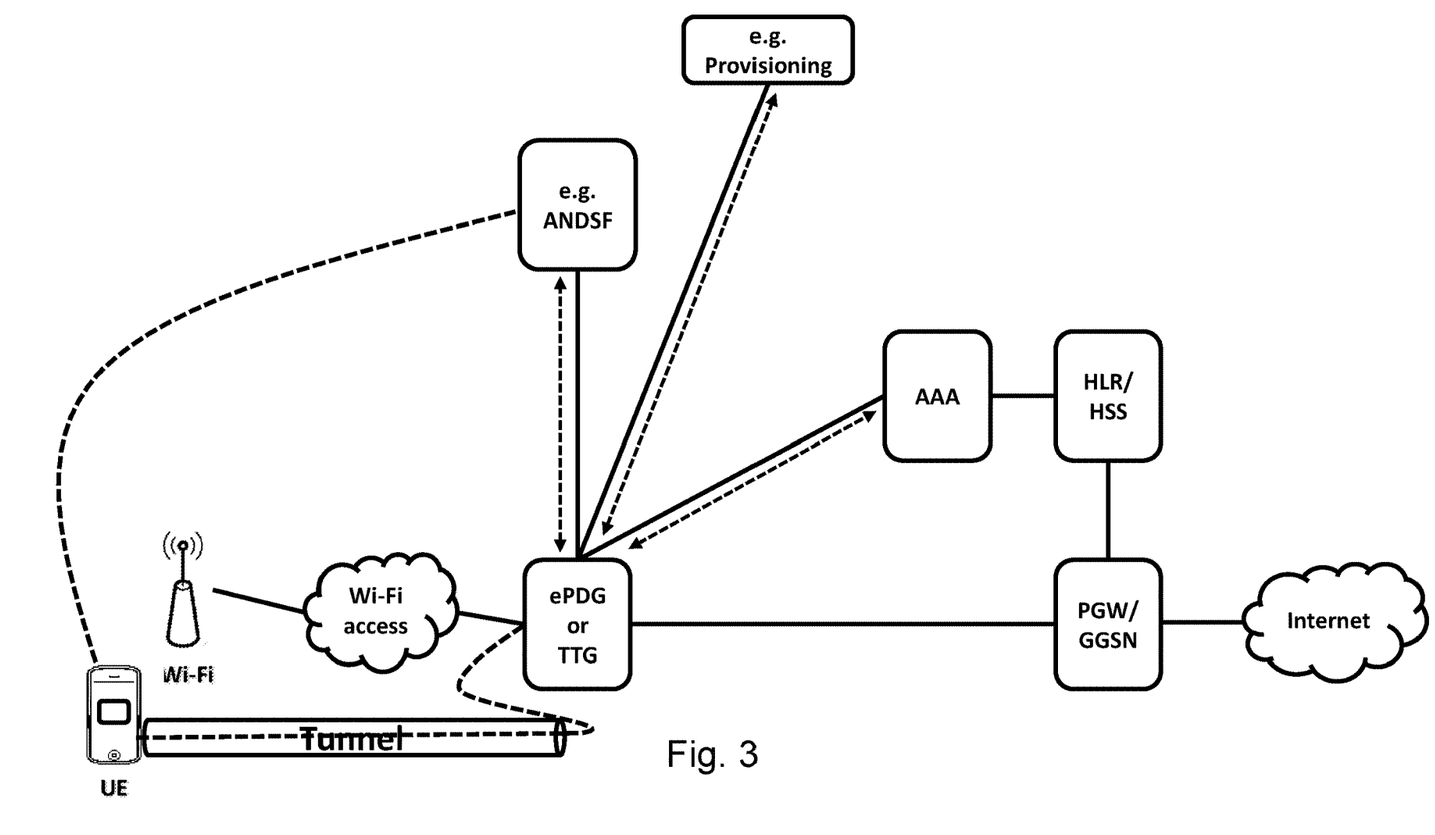
FIG. 3 is a schematic diagram of entities of a communication system used in a second embodiment according to the invention for using an untrusted wireless radio access network, especially Wi-Fi, as access to the untrusted function of the mobile packet core network for using services of the mobile packet core network.

FIG. 3 is a schematic diagram of entities of a communication system used in a second embodiment according to the invention. An untrusted wireless radio access network, especially Wi-Fi, is used as access to the untrusted function of the mobile packet core network for using services of the mobile packet core network. In contrast to the embodiment according to FIG. 1, for an access to the untrusted function of the mobile packet core network the secure tunnel connection is established from a mobile device (UE) to a node of the mobile packet core network, at hand the ePDG or TTG of the mobile packet core network. The ePDG is part of an untrusted function of the mobile packet core network, if the customer wishes to establish a secure tunnel connection to this part of the mobile packet core network from its mobile device (UE). As a secure tunnel connection, at hand an IPSec tunnel connection is used between the mobile device (UE) and the ePDG. For the secure tunnel connection is schematically drawn in FIG. 3 by using a dashed line from the mobile device to the ePDG node of the mobile packet core network. Furthermore between the ePDG or TTG and the PGW/GGSN a GTPv2 connection is used, so that traffic between the mobile device to the untrusted function of the mobile packet core network can be transmitted.

Figure 4:
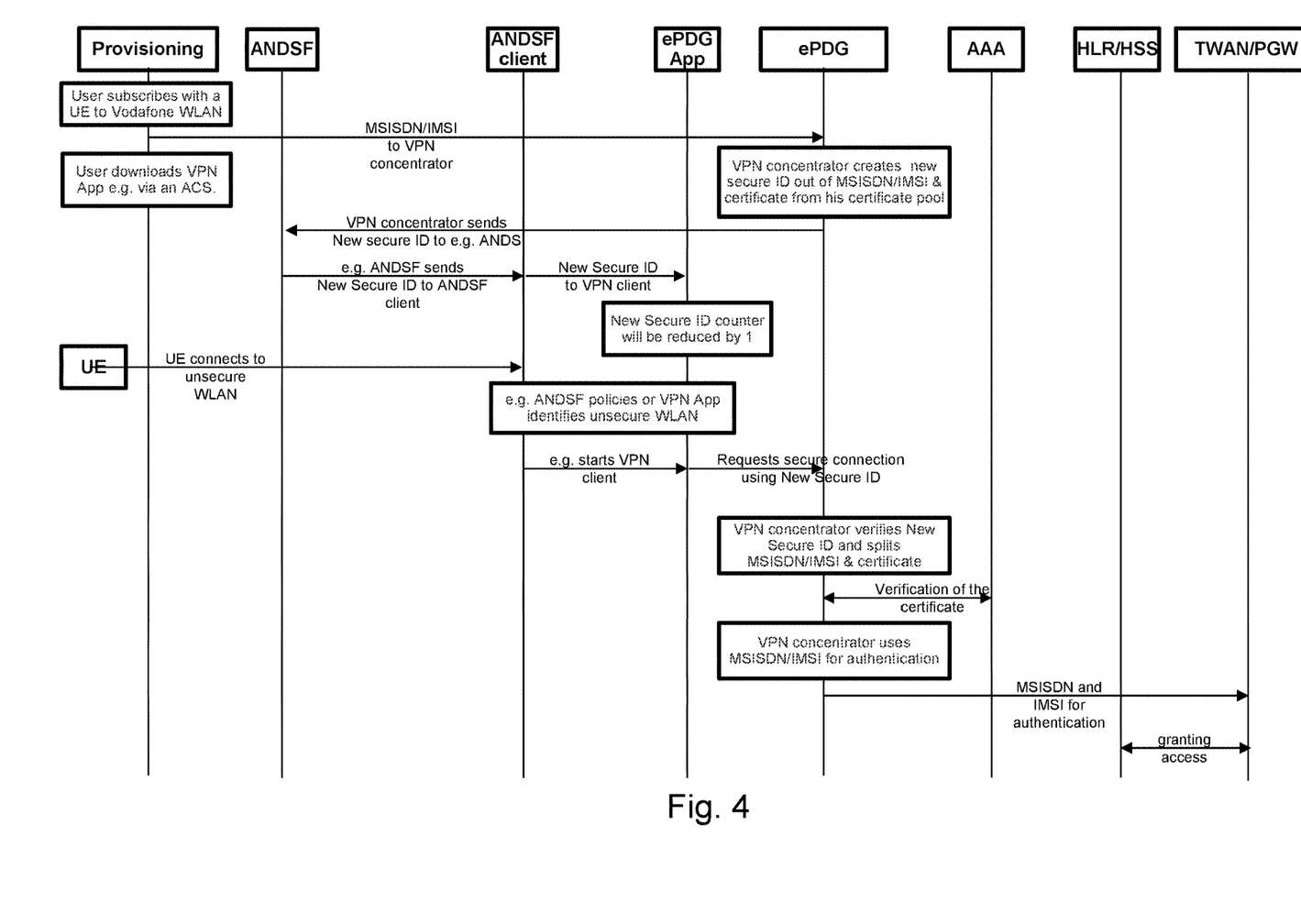
FIG. 4 is an information flow of the embodiment according to FIG. 3 of the invention for using wireless radio access network as access to the mobile packet core network.

The information flow of the method according to the present invention according to FIG. 4 of the embodiment according to FIG. 3 (access to untrusted function of mobile packet core network) comprises the following steps:

a) User subscribe to service via provisioning system;

b) Provisioning system will pass MSISDN and/or IMSI information to ePDG. If subscriber does not have a SIM/USIM card, provisioning system will generate a virtual MSISDN and/or virtual IMSI;

c) ePDG generates a new Secure ID out of a certificate (ePDG has a limited amount of certificates it could use) and the MSISDN respectively virtual MSISDN and/or IMSI respectively virtual IMSI. ePDG is using tools like e.g. TPM to create the new Secure ID;

d) User downloads the ePDG application via e.g. ACS;

e) ePDG sends the created new Secure ID to the ANDSF or directly to the ePDG application in a secure way (preferable via macro network). New Secure ID will be stored in a secure area of the device;

f) New Secure ID counter will be reduced by one when transmitted to ePDG application. If the counter already has been reduced the new Secure ID is not valid anymore and the ePDG application will not work;

g) When user connects to untrusted Wi-Fi network the UE (e.g. using ANDSF) will establish a secure ePDG connection to the ePDG using the new Secure ID;

h) ePDG verifies if this a valid new Secure ID including the verification of the new Secure ID counter. If yes the ePDG extracts the new Secure ID to get the certificate out of the pool it has and the MSISDN respectively virtual MSISDN and/or IMSI respectively virtual IMSI;

i) ePDG passes the certificate e.g. to AAA or an equivalent PKI system to get secure accesses to the ePDG;

j) ePDG will use MSISDN respectively virtual MSISDN and/or IMSI respectively virtual IMSI to establish a connection to PGW; and k) Remain of the flow is standard.

The exemplary embodiments of the invention represented in the figures and described in connection with these only serve for explaining of the invention and are not limiting for the invention.

LIST OF REFERENCE NUMERALS

UE/MS mobile device (mobile phone, smart phone, tablet or any other mobile communication terminal capable of connecting to a wireless radio access network)
Wi-Fi wireless radio access network
VPN Virtual Private Network
AAA Authentication, Authorization and Accounting
ANDSF Access Network Discovery and Selection Function
HLR Home Location Register
HSS Home Subscriber Server
PGW PDN (PDN: Packet Data Networks) Gateway
GGSN Gateway GPRS Support Node
ePDG evolved Packet Data Gateway
TTG Tunnel Termination Gateway
TWAN Trusted WLAN Access Network

What is claimed is:

1. A method for using a service of a mobile packet core network in a communication system comprising a mobile device, a node, a mobile packet core network and a wireless radio access network, the method comprising:
accessing the mobile packet core network via the wireless radio access network;
during a setup of a connection of the mobile device to the wireless radio access network, determining whether the wireless radio access network is a trustworthy wireless radio access network;
at least if the wireless radio access network is not trustworthy, establishing a secure tunnel connection to the node of the communication system for triggering a usage of a service of the mobile packet core network by an authentication entity, wherein the secure tunnel connection is established by using a token stored within the mobile device and received from the mobile device by the node, whereby the token comprises a certificate for authentication to the authentication entity, and at least one of a Mobile Subscriber Integrated Services Digital Network (MSISDN) or virtual MSISDN, and/or an International Mobile Subscriber Identity (IMSI) or virtual IMSI allocated to a user of the mobile device and whereby the token is generated by the node using general security mechanisms including Trusted Platform Module (TPM) or Message-Digest Algorithm (MD5) to encrypt the token so that, when the encrypted token is transmitted to the mobile device after completion of an initial setup, the encrypted token is stored within the mobile device; and
wherein the node transmits the generated token to a provisioning system for verifying the generated token at the first time a usage of a service of the mobile packet core network is requested by the mobile device.

2. The method according to claim 1, wherein the token further comprises a timer and/or counter value for preventing fraud of the token by decrementing the timer and/or counter value by 1 by the provisioning system during the first time a usage of a service of the mobile packet core network is requested by the mobile device, whereby the token is transmitted from the provisioning system to the mobile device after the decrement of the timer and/or counter.

3. The method according to claim 2, wherein the node rejects the received token if the timer and/or counter value is decremented by more than 1 to prevent fraud of the token.

4. The method according to claim 1, wherein the node verifies the received token by using the general security mechanisms used to generate the token when an authentication request of the mobile device is received.

5. The method according to claim 1, wherein the node extracts the certificate, the MSISDN or virtual MSISDN, and the IMSI or virtual IMSI out of the received token.

6. The method according to claim 5, wherein the node passes the extracted certificate to the authentication entity, which uses the extracted certificate for triggering usage of a service of the mobile packet core network.

7. The method according to claim 5, wherein the node uses the extracted MSISDN or virtual MSISDN, and IMSI or virtual IMSI to establish the secure tunnel connection to the mobile packet core network for triggering a usage of a service of the mobile packet core network.

8. The method according to claim 1, wherein the node retrieves the MSISDN or virtual MSISDN, and/or IMSI or virtual IMSI allocated to the user of the mobile device out of a database of the communication system triggered by the provisioning system.

9. The method according to claim 1, wherein the provisioning system generates the MSISDN or virtual MSISDN, and the IMSI or virtual IMSI if the mobile device does not have a Subscriber Identity Module (SIM) or Universal SIM (USIM), and reports the generated virtual MSISDN and virtual IMSI to the node of the mobile packet core network.

10. The method according to claim 1, wherein the provisioning system is part of the node and/or the node is part of the mobile packet core network.

11. A communication system comprising:
a mobile packet core network node;
a mobile device;
a mobile packet core network to which the mobile device can establish a secure tunnel connection via the mobile packet network node;
a wireless radio access network; and
wherein the mobile packet core network node is configured to:
generate a token using general security mechanisms, including Trusted Platform Module (TPM) or Message-Digest Algorithm 5 (MD5) to encrypt the token so that, when the encrypted token is transmitted to the mobile device after completion of an initial setup, the encrypted token is stored within the mobile device, whereby the token comprises a certificate for authentication to an authentication entity, and at least one of a Mobile Subscriber Integrated Services Digital Network (MSISDN) or virtual MSISDN, and/or a International Mobile Subscriber Identity (IMSI) or virtual IMSI allocated to a user of the mobile device; and
establish a secure tunnel connection to the mobile packet core network by using a token received by the mobile device; and
wherein the mobile packet core network node is further configured to transmit the generated token to a provisioning system for verifying the generated token at the first time a usage of a service of the mobile packet core network is requested by the mobile device.

12. The communication system according to claim 11, wherein the mobile packet core network node is further configured to reject a received token when a timer and/or a counter value of the token is decremented by more than 1 to prevent fraud of the token.

13. The communication system according to claim 11, wherein the mobile packet core network node is further configured to verify a token received by the mobile device by using the general security mechanisms used to generate the token when an authentication request of the mobile device is received.

14. The communication system according to claim 11, wherein the mobile packet core network node is further configured to extract the certificate, the MSISDN or virtual MSISDN, and the IMSI or virtual IMSI out of the received token.

15. The communication system according to claim 14, wherein the mobile packet core network node is further configured to pass the extracted certificate to an authentication entity for triggering a usage of a service of the mobile packet core network.

16. The communication system according to claim 14, wherein the mobile packet core network node is further configured to establish the secure tunnel connection to the mobile packet core network for triggering a usage of a service of the mobile device by using the extracted MSISDN or the virtual MSISDN, and the IMSI or the virtual IMSI.

17. The communication system according to claim 14, wherein the mobile packet core network node is further configured to retrieve the extracted MSISDN or the virtual MSISDN, and/or the extracted IMSI or the virtual IMSI allocated to the user of the mobile device out of a database of the communication system triggered by a provisioning system.

18. A system for using a service of a mobile packet core network in a communication system comprising:
a node of the communication system;
a provisioning system of the communication system; and
a mobile device of the communication system, whereby the node, the provisioning system to:
access the mobile packet core network via wireless radio access network;
determine whether the wireless radio access network is a trustworthy wireless radio access network during a setup of a connection of the mobile device to the wireless radio access network;
establish a secure tunnel connection to the node of the communication system for triggering a usage of a service of the mobile packet core network by an authentication entity at least if the wireless radio access network is not trustworthy, wherein the secure tunnel connection is established by using a token stored within the mobile device and received from the mobile device by the node whereby the token comprises a certificate for authentication to the authentication entity, and at last one of a Mobile Subscriber Integrated Services Digital Network (MSISDN) or virtual MSISDN, and/or a International Mobile Subscriber Identity (IMSI) or virtual IMSI allocated to a user of the mobile device and whereby the token is generated by the node using general security mechanisms including Trusted Platform Module (TPM) or Message-Digest Algorithm 5 (MD5) to encrypt the token so that, when the encrypted token is transmitted to the mobile device after completion of an initial setup, the encrypted token is stored within the mobile device; and
wherein the node transmits the generated token to a provisioning system for verifying the generated token at the first time a usage of a service of the mobile packet core network is requested by the mobile device.

19. The system of claim 11, wherein the mobile packet core network node comprises a Virtual Private Network (VPN) concentrator node, Evolved Packed Data Gateway (ePDG), or a Tunnel Termination Gateway (TTG).

* * * * *